US012606364B2

(12) United States Patent
Hodges

(10) Patent No.: US 12,606,364 B2
(45) Date of Patent: Apr. 21, 2026

(54) CONSUMABLE PACK

(71) Applicant: British American Tobacco (Investments) Limited, London (GB)

(72) Inventor: Paul Hodges, London (GB)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 18/004,701

(22) PCT Filed: Jul. 8, 2021

(86) PCT No.: PCT/GB2021/051747
§ 371 (c)(1),
(2) Date: Jan. 9, 2023

(87) PCT Pub. No.: WO2022/008921
PCT Pub. Date: Jan. 13, 2022

(65) Prior Publication Data
US 2023/0249898 A1 Aug. 10, 2023

(30) Foreign Application Priority Data
Jul. 9, 2020 (GB) ..................................... 2010524

(51) Int. Cl.
*B65D 85/10* (2006.01)
*B31B 50/25* (2017.01)
*B31B 120/10* (2017.01)
*B65D 51/24* (2006.01)

(52) U.S. Cl.
CPC ........ *B65D 85/10568* (2020.05); *B31B 50/25* (2017.08); *B65D 51/245* (2013.01); *B31B 2120/102* (2017.08); *B31B 2241/003* (2013.01); *B65D 2203/02* (2013.01)

(58) Field of Classification Search
CPC .............. B31B 50/25; B31B 2120/102; B31B 2241/003
USPC ........................................................ 206/268
See application file for complete search history.

(56) References Cited

U.S. PATENT DOCUMENTS

| | | | | |
|---|---|---|---|---|
| 6,364,106 | B1 | 4/2002 | Fagg et al. | |
| 10,507,949 | B1 * | 12/2019 | Nunez | B65D 5/18 |
| 10,894,627 | B1 * | 1/2021 | Nicholson | B65D 5/4245 |
| 2010/0293890 | A1 * | 11/2010 | Pare | B65D 81/02 53/139.6 |
| 2011/0000802 | A1 | 1/2011 | Weiss et al. | |

(Continued)

FOREIGN PATENT DOCUMENTS

| | | | |
|---|---|---|---|
| EP | 0545723 | A1 | 6/1993 |
| EP | 2360099 | A1 | 8/2011 |

(Continued)

OTHER PUBLICATIONS

"Cigarette—Dunhill Fine Cut Gold," PARMAONLINE, 2022, 1 page, Retrieved from the Internet: URL: https://parma.am/en/product/product?slug=cigarette-dunhill-fine-cut-gold_13011.
"Coding Tobacco Products—Track and Trace," Videojet, 2022, 1 page, Retrieved from the Internet: URL: https://www.videojet.com/us/homepage/industry-solutions/tobacco.html.
International Search Report and Written Opinion for International Application No. PCT/GB2021/051747, mailed Oct. 27, 2021, 13 pages.

(Continued)

*Primary Examiner* — Rafael A Ortiz
(74) *Attorney, Agent, or Firm* — Merchant & Gould P.C.

(57) ABSTRACT

A pack for consumables, the pack being formed from a folded blank of material having a thickness, wherein the pack comprises a cut in an outer surface of the pack that extends only partially through the thickness of the folded blank of material.

18 Claims, 6 Drawing Sheets

(56) References Cited

U.S. PATENT DOCUMENTS

| | | | | |
|---|---|---|---|---|
| 2014/0374291 | A1* | 12/2014 | Young | B65D 85/10 206/268 |
| 2015/0075115 | A1* | 3/2015 | Valls | A24F 15/12 206/268 |
| 2019/0263556 | A1 | 8/2019 | Cailleaux et al. | |

FOREIGN PATENT DOCUMENTS

| | | | | |
|---|---|---|---|---|
| EP | 2700583 | A1 | 2/2014 | |
| EP | 2860024 | A1 | 4/2015 | |
| WO | WO-2012123189 | A1 * | 9/2012 | B31B 1/00 |
| WO | WO-2016189133 | A1 * | 12/2016 | A24F 15/18 |
| WO | WO-2018197880 | A1 * | 11/2018 | B65D 5/5838 |

OTHER PUBLICATIONS

"King Dragon: LAIFU Cigarette Case, Ultra-Thin, Automatic, King Dragon Design, Metal E-Cigarette Boxes, Laser Design (King Dragon)," Amazon, Jun. 19, 2017, 2 pages, Retrieved from the Internet: URL: https://www.amazon.in/King-Dragon-Cigarette-Ultra-Thin-Cigarette/dp/B01MR5GCH2.

"Tobacco—Janoschka Packaging, Decor, Security, Solutions, Prepress," Janoschka, 2022, 1 page, Retrieved from the Internet: URL: https://www.janoschka.com/showroom/tobacco/.

"International Preliminary Report on Patentability received for PCT Patent Application No. PCT/GB2021/051747, mailed on Jan. 19, 2023", 7 Pages.

* cited by examiner

CONSUMABLE PACK

CROSS-REFERENCE TO RELATED APPLICATIONS

The present application is a National Phase entry of PCT Application No. PCT/GB2021/051747, filed Jul. 8, 2021, which claims priority from Great Britain Application No. 2010524.3, filed Jul. 9, 2020, each of which is hereby fully incorporated herein by reference

TECHNICAL FIELD

The present disclosure relates to a pack containing consumables and to a method of forming the same.

BACKGROUND

Tobacco industry products, such as cigarettes, are sold in packs. Known packs typically comprise an outer carton with a flip top lid. The packs are formed from pre-cut blanks of paperboard material which are folded and glued together. Overlapping glued panels of the blank are held together in a plough folder to allow the glue time to dry. If the packs are passed through the plough folder before the glue is sufficiently dry, the panels may spring apart and return to their pre-folded position, requiring the pack to be discarded.

SUMMARY

In accordance with some embodiments described herein, there is provided a pack for consumables, the pack being formed from a folded blank of material having a thickness, wherein the pack comprises a cut in an outer surface of the pack that extends only partially through the thickness of the folded blank of material.

The cut may extend along a fold line between adjacent walls of the pack.

The pack may comprise a front panel and a rear panel separated by side panels and wherein the cut comprises cuts extending along fold lines between the front panel and side panels and along fold lines between the rear panel and side panels.

The pack may be formed from a blank made of paper board.

The paper board may be between 0.1 mm and 1 mm thick.

The paper board may comprise a basis weight between 200 gsm and 270 gsm.

The paper board may comprise a basis weight of 200 gsm; or 240 gsm; or 270 gsm.

The cut may be between 10% and 80% of the paper board thickness.

The cut may be 20% of the board thickness; or 30% of the board thickness; or 40% of the board thickness.

The cut may be between 0.08 mm and 0.35 mm wide.

The cut may be less than 0.15 mm wide.

The pack may comprise a lid rotatably connected to the rear panel of the pack

The lid may comprise a front panel and a rear panel separated by side panels and wherein the cut comprises cuts extending along fold lines between the front panel and side panels and along fold lines between the rear panel and side panels.

The cut may comprise adjacently extending cuts that delimit an intermediate surface of the pack, wherein the intermediate surface extends between two surfaces of the pack that are perpendicular to each other.

The intermediate surface may comprise two or more surfaces that are arranged at an oblique angle with respect to each other.

The cut may define a pattern in the outer surface of the pack.

The pattern may comprise a tessellation of polygons.

The pack may comprise a bundle of consumables wrapped in a barrier material.

The barrier material may comprise a consumable extraction region and wherein a label is provided attached to the barrier material to cover the extraction region.

The label may have a peripheral portion that extends beyond the extraction region and is peelable in use away from the barrier material to open the extraction region to provide access to the consumables.

The label may be attached to the lid so that in use the peripheral portion of the label is peeled away from the barrier material at the same time the lid is rotated into the open position.

In accordance with some embodiments described herein, there is also provided a method of forming a pack for consumables comprising forming a cut in a blank of material; and folding said blank of material into a pack so that said cut is on an outer surface of the blank.

BRIEF DESCRIPTION OF THE DRAWINGS

Embodiments of the disclosure will now be described, by way of example only, with reference to the accompanying drawings, in which.

DETAILED DESCRIPTION OF THE DRAWINGS

The following relates to packaging for consumables. In some embodiments a consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

Aerosol-generating material is a material that is capable of generating aerosol, for example when heated, irradiated or energized in any other way. Aerosol-generating material may, for example, be in the form of a solid, liquid or gel which may or may not contain an active substance and/or flavorants. In some embodiments, the aerosol-generating material may comprise an "amorphous solid", which may alternatively be referred to as a "monolithic solid" (i.e., non-fibrous). In some embodiments, the amorphous solid may be a dried gel. The amorphous solid is a solid material that may retain some fluid, such as liquid, within it. In some embodiments, the aerosol-generating material may for example comprise from about 50 wt %, 60 wt % or 70 wt % of amorphous solid, to about 90 wt %, 95 wt % or 100 wt % of amorphous solid.

The aerosol-generating material may comprise one or more active substances and/or flavors, one or more aerosol-former materials, and optionally one or more other functional material.

In some embodiments, the aerosol generating material comprises tobacco; and in some embodiments the consumable is a cigarette, cigarillo or cigar.

Flip top packs 1 and blanks 1' for making flip top packs 1 according to embodiments of the disclosure are described below.

Figure 3A:
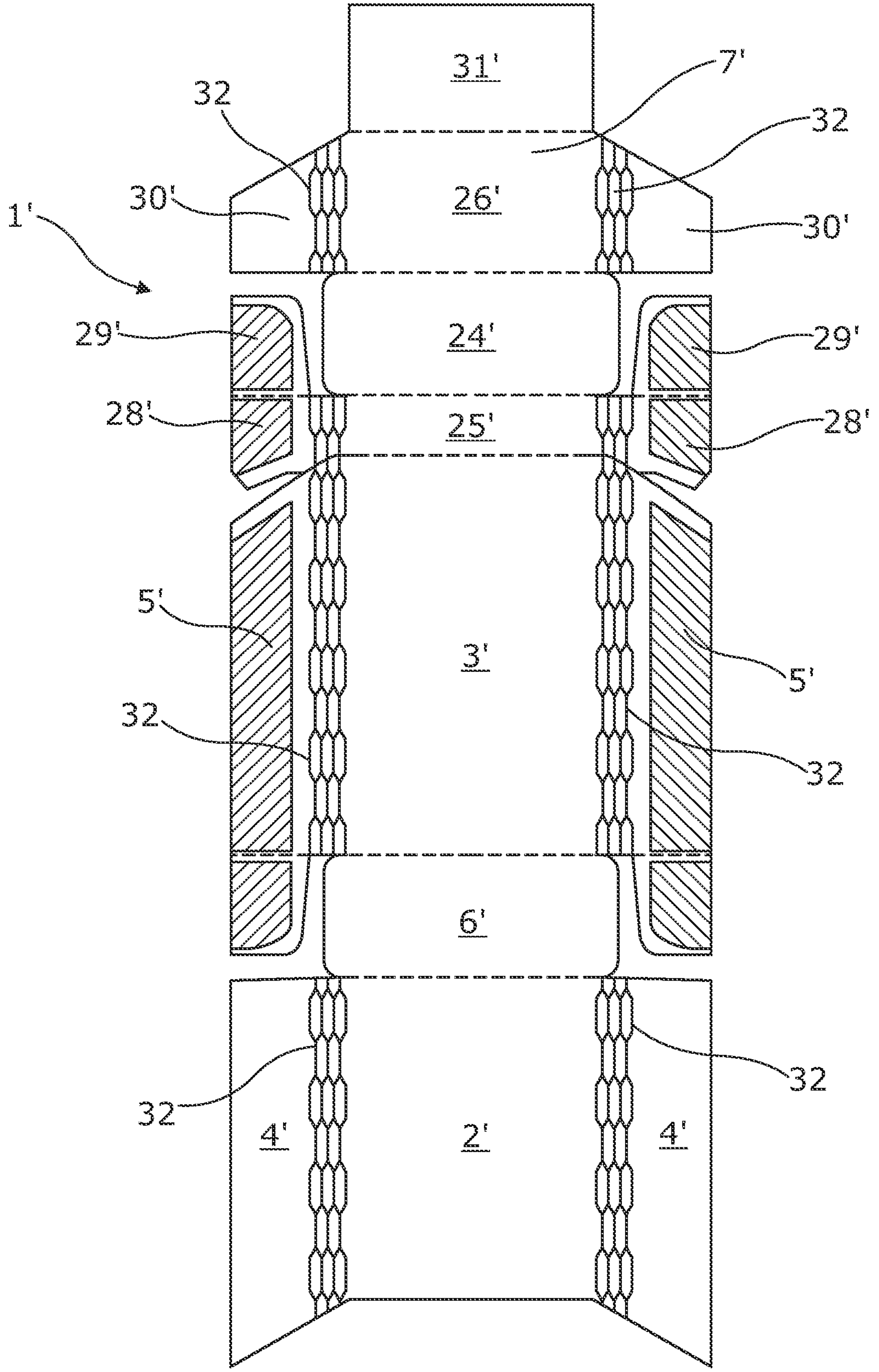
FIG. 3*a* shows a blank for forming a pack according to an embodiment of the disclosure.
Figure 3B:
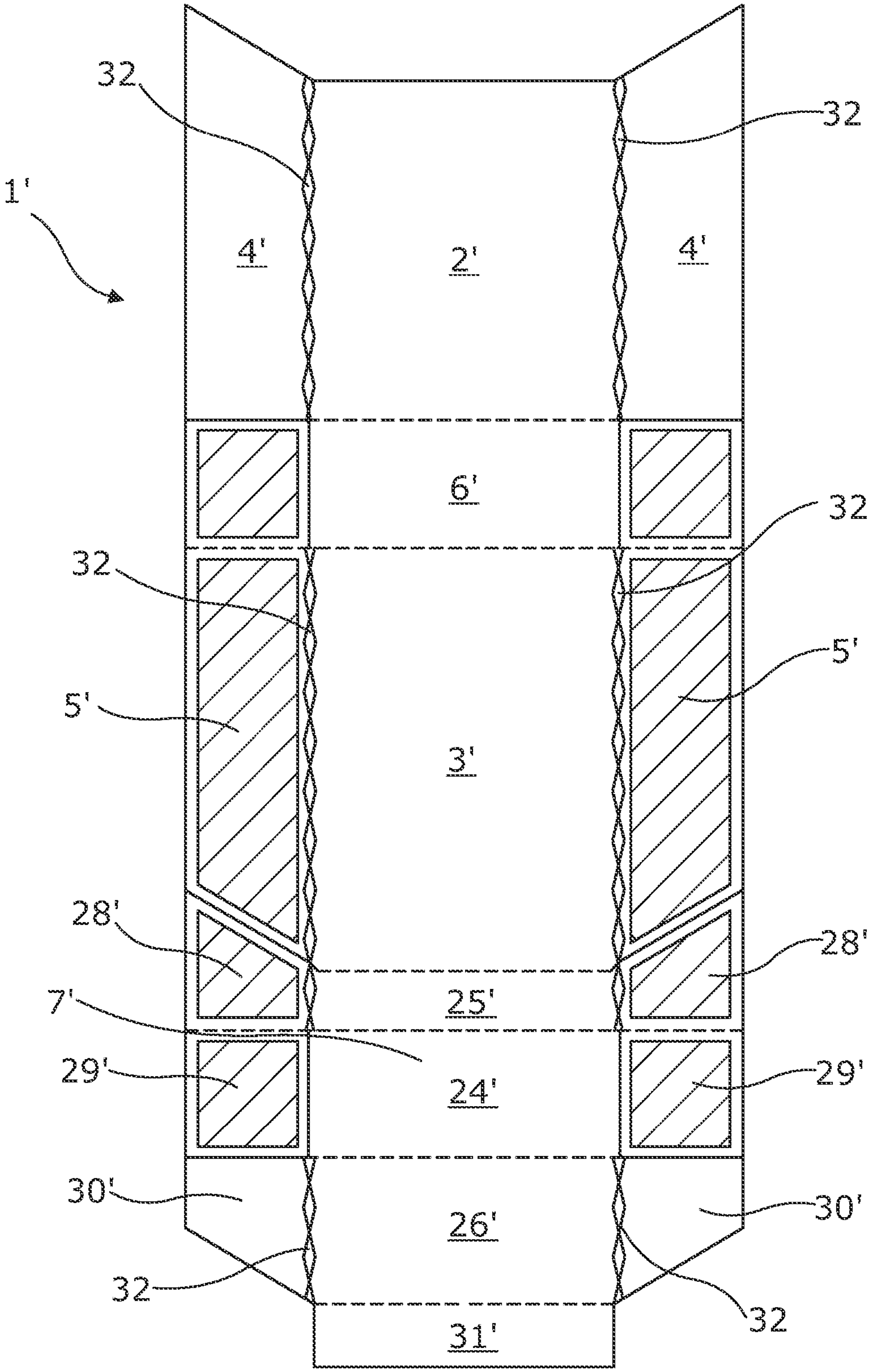
FIG. 3*b* shows a blank for forming a pack according to an embodiment of the disclosure.
Figure 3C:
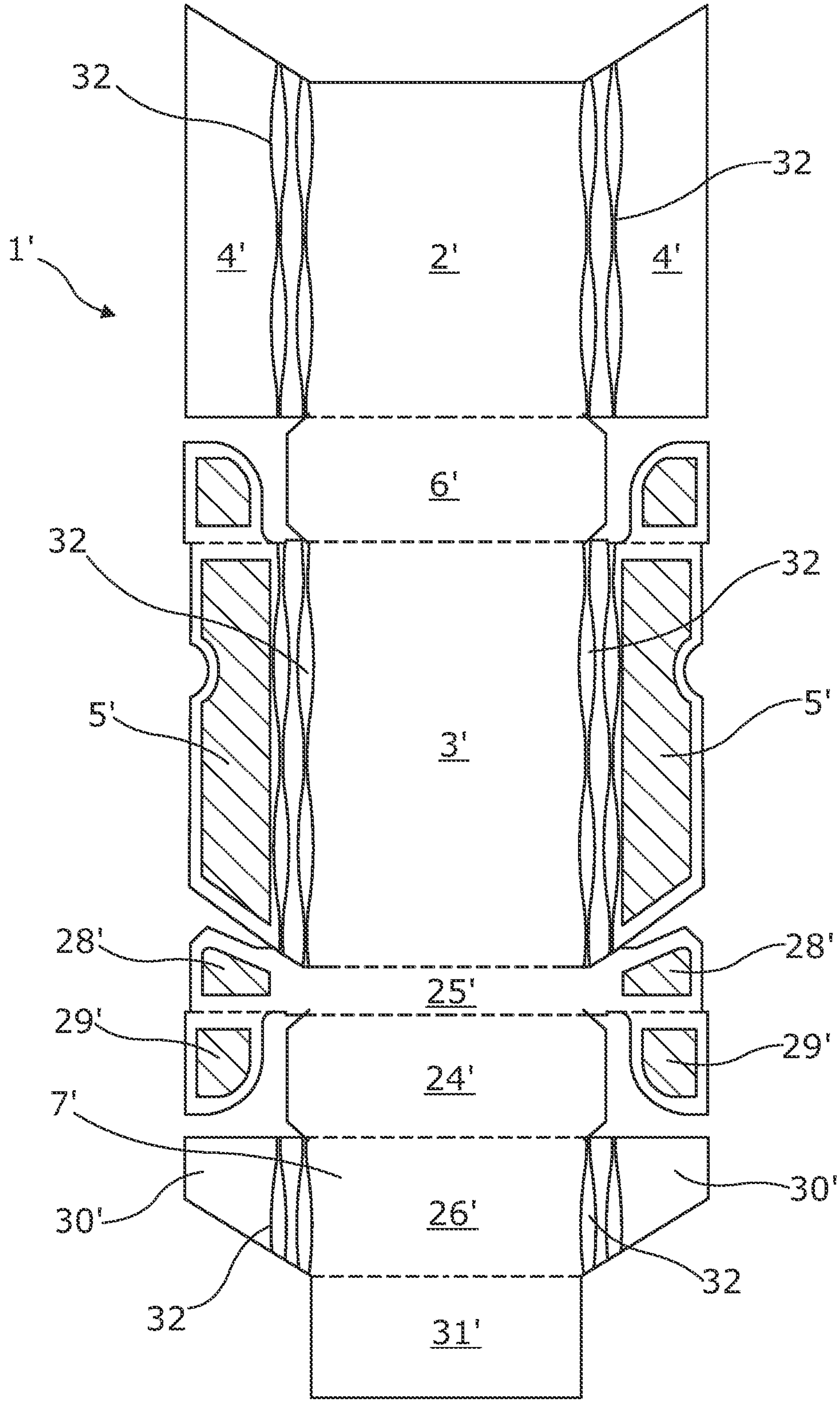
FIG. 3*c* shows a blank for forming a pack according to an embodiment of the disclosure.

FIGS. 3*a*-3*c* show blanks 1' in accordance with some embodiments described herein.

Each blank 1' comprises a front panel 2', rear panel 3', side panels 4', 5', a bottom panel 6' and a hinged lid 7'. Selected panels of the blanks are folded and glued together during assembly to form corresponding walls 2, 3, 4, 6 and lid 7 of a flip top pack 1, such as the flip top packs 1 shown in FIGS. 1 and 2. Each blank 1' is formed of sheet material such as paper board. The paper board used in the pack may have a weight of 180-300 g/squ·m, more typically 200-280 g/squ·m, for example 240 g/squ·m, although a lighter material may be used, for example 215 g/squ·m. or even 200 g/squ·m. The paper board is typically of the order of 0.3 mm thick.

Figure 1:
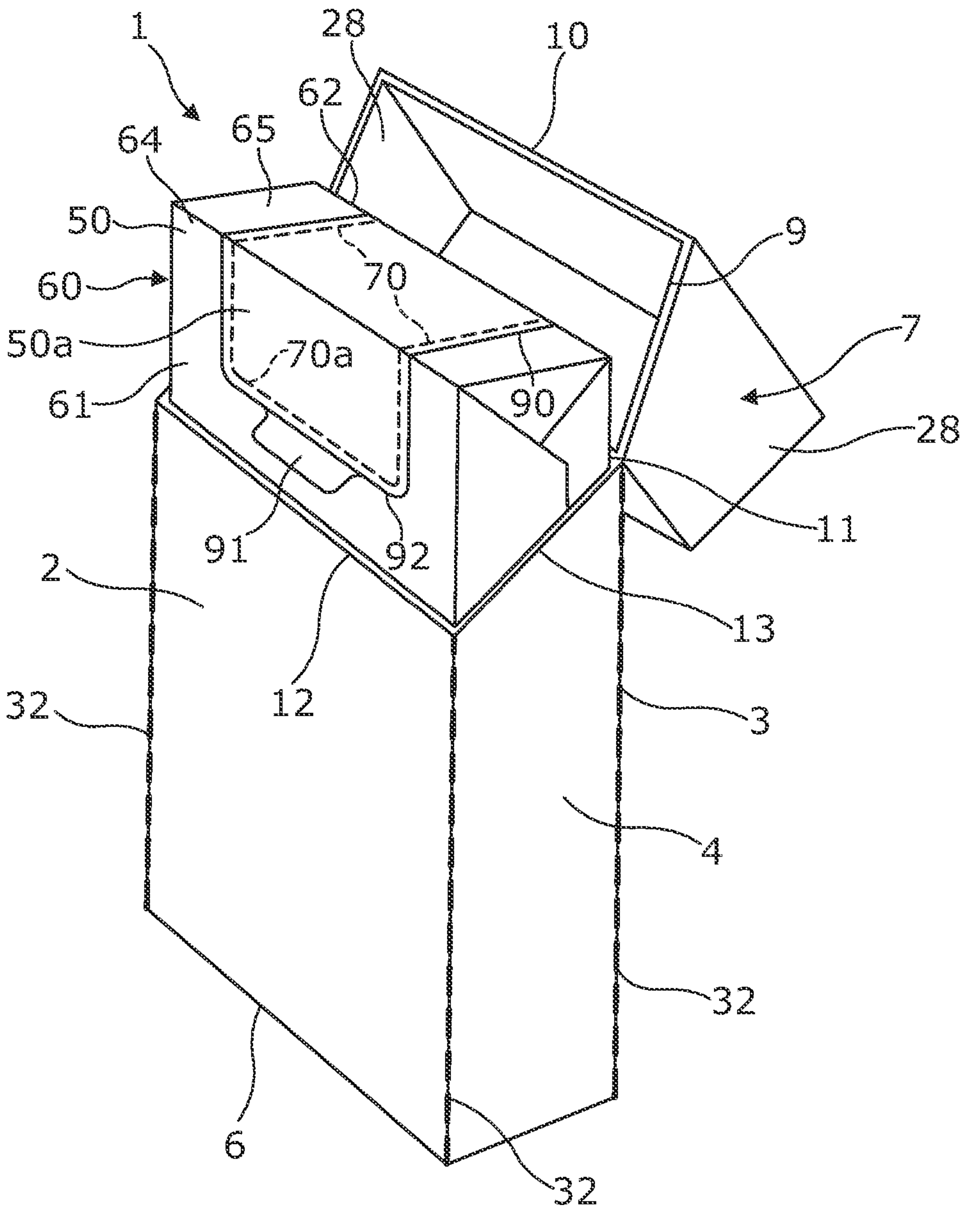
FIG. 1 shows a pack according to an embodiment of the disclosure.
Figure 2:
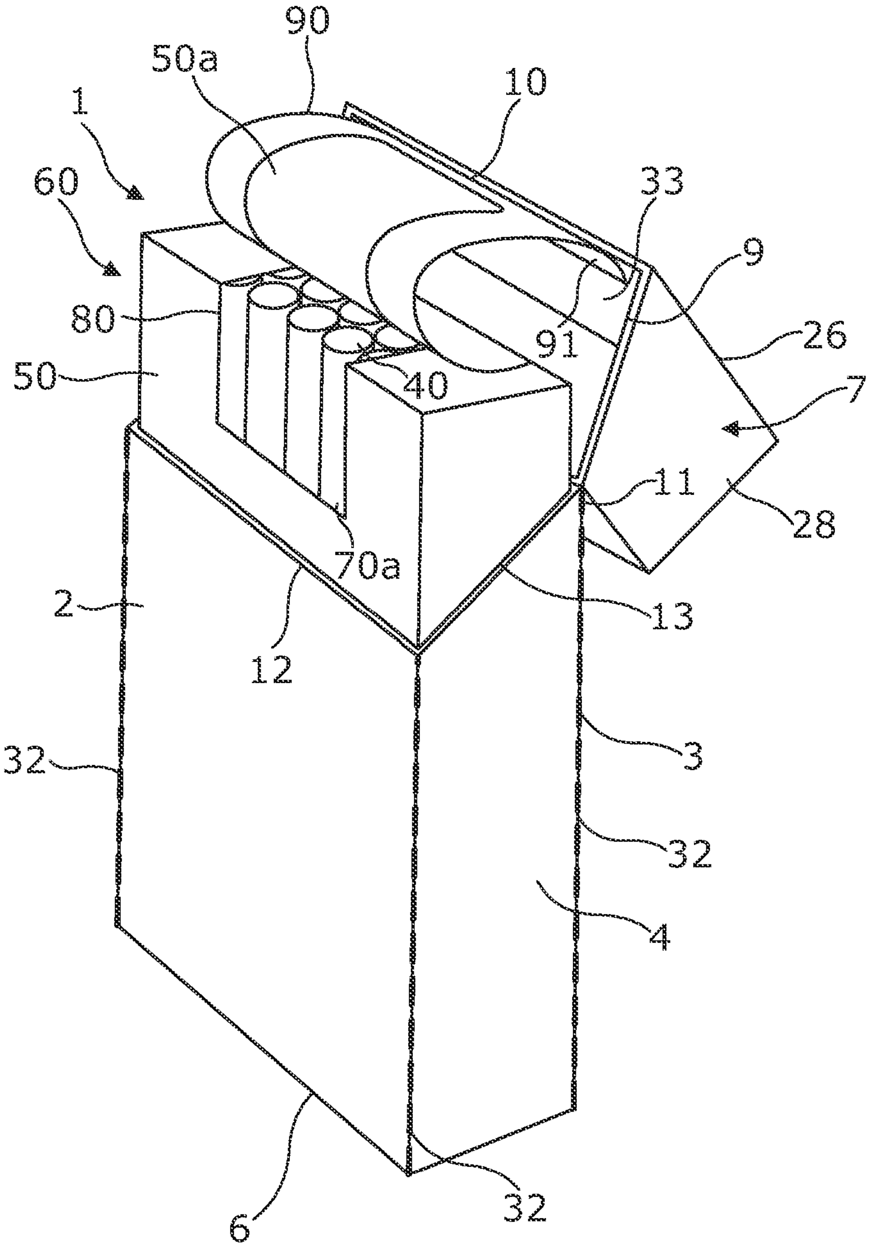
FIG. 2 shows a pack according to an embodiment of the disclosure.

As illustrated by FIGS. 1 and 2, the lid 7 has sloping side edges 9 and a front edge 10 which in a closed position is lower than hinge line 11 for the lid, and upper edges 12, 13 of the front and side panels 2, 4, 5 are correspondingly shaped to provide a close fit when the lid is shut. In the embodiment shown, and as well known in the art, the sloping arrangement of the lid 7 provides improved access to the cigarettes when the lid is opened.

The pack 1 comprises a bundle of cigarettes wrapped in a barrier material 50—herein referred to as a barrier layer 50—forming a wrapped bundle 60. The barrier layer 50 comprises an extraction region such as an opening 80 in the barrier layer 50. In the embodiments illustrated by FIGS. 1 and 2, the bundle comprises a label 90 that is attached to said barrier layer 50 to cover the extraction opening 80, wherein the label 90 has a peripheral portion that extends beyond the extraction opening 80 and is peelable in use away from the barrier layer 50 to open the extraction opening 80 to provide access to the consumables. In the embodiments of FIGS. 1 and 2, a section 50*a* of the barrier layer 50 is lifted with the label 90 during opening. The barrier layer 50 may be made from a metalized plastic, a metalized paper, a plastics/metal foil laminate or a paper/metal foil laminate. In some embodiments, the label 90 is dispensed with and an extraction region 80 is created when a portion of the barrier material is torn away and discarded.

Figure 4:
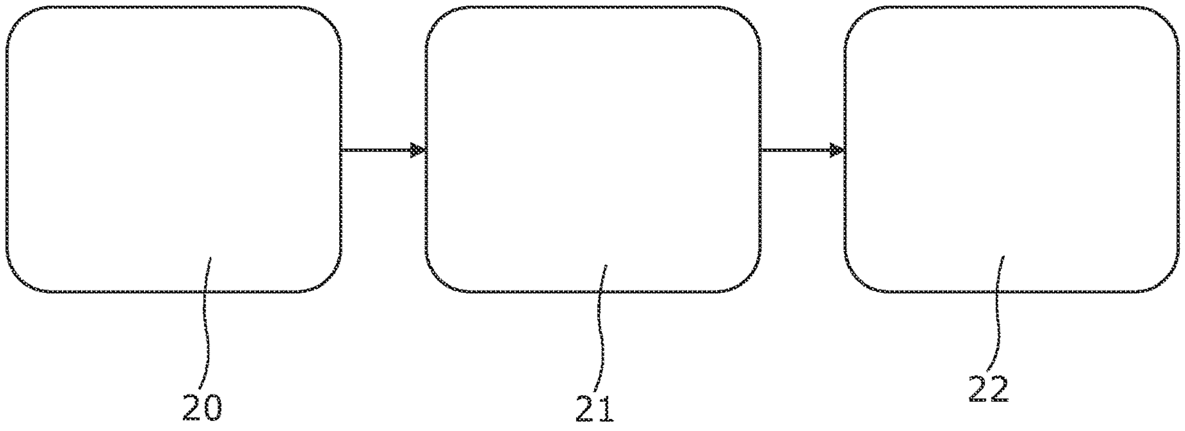
FIG. 4 shows the assembly steps of a a pack according an embodiment of the disclosure.

A method of packaging cigarettes in the pack 1 will now be described with reference to FIG. 4. A magazine 20 contains a plurality of blanks 1'. The blanks 1' are pre-formed with fold lines which separate the different panels of the blank. Individual blanks are conveyed sequentially to a cutting station 21 at which partial cuts are made in the outer surface of the blank 1'. Thereafter, the blanks 1' are fed to a cigarette packaging machine 22 that is fed with a supply of cigarettes. The cigarette packaging machine 22 folds selected panels of the blank 1' about the pre-formed fold lines so as to form the pack 1 and fills it with cigarettes wrapped in barrier material.

Referring to FIGS. 3*a* to 3*c*, the front panel 2' and the rear panel 3' of the blank are connected by the base panel 6'. Side panels 4', 5' depend from the front and rear panels 2', 3' respectively. The lid depends from the rear panel 3', opposite the base. The lid comprises a lid top panel 24', a lid rear panel 25', lid front panel 26' and re-entrant flaps 28'-30'.

In the cigarette packaging machine 22, the front and rear panels 2', 3' are folded perpendicular to the base panel 6' so as to face each other. The side panels 4', 5' are folded inwards to overlie one another and are glued together to form side walls 4 of the pack 1. The lid 7 is formed by folding the lid front panel 26' and the lid rear panel 25' perpendicular to the lid top panel 24'. The re-entrant flaps 28'-30' are folded inwards and glued together to form side walls 28 of the lid. A tuck in flap 31' depending from the lid front panel 26' is folded onto an inside face of the lid front panel 26' and glued down.

Adhesive is pre-applied to the side panels 4', 5' and re-entrant flaps 28', 29' prior to the blank being folded to form the pack 1. Once the blank has been folded, the pack 1 is held in a plough folder of the cigarette packaging machine 22 while the adhesive dries to prevent the side panels 4', 5' and re-entrant flaps 28'-30' from springing apart prematurely.

Each of the blanks 1' illustrated in FIGS. 3*a*-3*c* comprise partial cuts 32 in the outer surface of the blank 1'. By outer surface of the blank 1' it is meant the surface of the blank 1' that becomes the outer surface of the pack 1 following folding of the blank 1' to form the pack 1. By partial cut 32, it is meant any cut made in the outer surface of the blank 1' that does not extend all the way through the blank 1'. In other words the depth of the partial cut 32 is less than the thickness of the blank 1'. For example, the partial cut 32 may be score line or a line of weakening.

In one embodiment, the partial cuts 32 are formed by a laser which is configured to scan across the outer surface of a blank 1' as it is fed through the cutting station 21. The laser is configured to ablate a predefined pattern into the outer surface of the blank 1'. In an alternate embodiment, the partial cuts 32 are formed by rollers which are configured to crush cut a predefined pattern into the outer surface of a blank 1' fed through the cutting station 21. For example, the rollers may comprise an anvil roller with a smooth surface and a cutting roller comprising a blade. In such an example, the rollers are driven around respective parallel axes and are spaced to about the thickness of the blank 1'. The cutting roller comprises a blade which is configured to crush cut the predefined pattern into the blank against the anvil roller. Other means of creating partial cuts 32 will be apparent to the person skilled in the art. Irrespective of the method used to make the partial cut 32, the key objective is to break the outer surface along the line of the cut 32 to alleviate the surface tension around the cut 32. Where a laser is used, board material is removed by ablation to create a channel in outer surface of the blank. Where a crush cutting process is used, the surface of the board under the blade is broken and crushed to create a channel. Partial cuts are 32 distinct from embossing, where the surface of the board around the resulting embossment is not broken.

In the illustrated embodiments the partial cuts 32 extend substantially along the fold lines that delimit panels 4', 5' from the respective front and rear panel portions 2', 3'; and/or along the fold lines that delimit lid front and rear panels 25', 26' from respective re-entrant flaps 28', 30'. The partial cuts are configured to weaken the fold lines by releasing surface tension in the outer surface of the blank 1'. The panels of the blank 1' are therefore easier to fold about the fold lines to form the pack 1. Therefore, when the panels are adhered to each other to form the pack 1, less time is required for the adhesive to set sufficiently before the pack 1 can be removed from the plough folder of the cigarette packaging machine 22 without the various adhered panels springing apart. This is because, where the partial cuts 32 extend along the fold lines, the surface tension alleviated by the partial cuts reduces the tendency of the folded panels to spring back to their pre-folded position. As allowing adhesive to set is a relatively time consuming process step performed by the cigarette packaging machine 22, providing partial cuts in the outer surface of the blanks 1' significantly improves the throughput of the machine 22.

It shall be appreciated that partial cuts 32 in the outer surface of the blank 1' may offer the advantages mentioned above while being narrower than an equivalent partial cut made in the inner surface. That is to say, partial cuts made on the inner surface of the blank that are configured to reduce the tendency of the folded panels to spring back to their pre-folded position have to be thicker across the width of the cut, than partial cuts 32 made in the outer surface. This is because, for the same effect to be achieved with partial cuts made on the inner surface, sufficient material must be removed to allow clearance for edges of the cut when the adjacent panels are folded to form the pack. By comparison, a partial cut 32 made in the outer surface does not have to provide any clearance for edges of the cut, as the edges of the cut are moved apart when the adjacent panels are folded to form the pack 1. The cutting process is therefore quicker for making partial cuts 32 in the outer surface of the pack 1 versus making partial cuts in the inner surface of the pack, as less material needs to be removed. Furthermore, the blanks 1' can be printed and cut on the same surface, meaning the blanks 1' don't have to be turned over for cutting in the cigarette packaging machine 22, removing a process step.

The partial cuts 32 may be between 10% and 80% of the thickness of the blank 1'. In one embodiment, the partial cut 32 is 20% of thickness of the blank 1'. In another embodiment, the partial cut 32 is 30% of thickness of the blank 1'. In another embodiment, the partial cut 32 is 40% of thickness of the blank 1'.

The partial cuts 32 may be between 0.08 mm and 0.35 mm wide. In one embodiment the partial cut 32 is less than 0.15 mm wide.

As shown in FIGS. 3*a*-3*c*, the partial cuts 32 may comprise a repeating pattern that will visually distinguish the pack 1. The pattern may also shape the edges of the pack 1: For example, the pattern may be configured to create a beveled edge or rounded edge pack. By beveled edge, it is meant that edges of the pack comprise an intermediate surface that extends obliquely between the adjacent perpendicular panels, such as the front panel 2 and adjacent side panel 4. One example pattern of partial cut 32 configured to form a beveled edge is shown in FIG. 3*c* and comprises elongate rhombus shaped regions tessellated along the fold lines. Another example pattern of partial cut 32—shown in FIG. 3—is configured to create a multi surfaced corner of the pack. The resulting impression is of a rounded corner.

The skilled person will appreciate that other patterns of partial cut 32 may be used. For example, in one embodiment, a single partial cut 32 may extend along each fold line between the front and rear panels 2, 3 and adjacent side panels 4.

In one embodiment, the partial cut 32 is continuous, that is to say, it extends in a unbroken fashion along the length of the fold line. In another embodiment, the partial cut 32 comprises a dashed line, as shown in FIGS. 1 and 2.

Referring again to FIGS. 1 and 2, the wrapped bundle 60 comprises a charge of cigarettes 40 and takes the form of a parallelepiped. For example, a charge of 20 cigarettes formed from 3 rows of cigarettes, the front and back rows being 7 cigarettes wide and the middle row being only 6 cigarettes wide, so as to allow the cigarettes to lie in a close packed arrangement. The parallelepiped bundle 60 has front face and rear faces 61, 62, each face 61, 62 defined as a plane lying across the front and rear rows of cigarettes respectively. The bundle 60 also has side faces 63, 64 which separate front and rear faces 61, 62 and a top face 65 and a bottom face (not shown). The top face lies 65 coincident with the upper ends—normally the filter ends—of the charge of cigarettes and the bottom face lies coincident with the bottom ends of the cigarettes.

In the embodiments of FIGS. 1 and 2, edges 70 of the extraction opening 80 are indicated by dotted lines extending from the rear face 62 of the bundle 60 across the top face 65 of the bundle 60 and down the front face 61 as far as a lower extraction opening edge 70*a*.

The label 90 is a layer of material having on its undersurface facing the barrier layer 50, and section 50*a*, a re-stick adhesive. Alternatively, a permanent bonding adhesive may be applied to the portion of the undersurface of the label 90 that overlaps section 50*a* but does not extend beyond it. Where the label 90 extends beyond the edges 70 of the extraction opening 80, the undersurface of the label 90 is provided with a coating of re-stick adhesive.

The label 90 comprises a tab 91 extending from a lower edge 92 of the label 90 which is at least partly free of re-stick adhesive so that it may be flicked up by a user and used to peel back the label 90 in order to open the extraction opening 80.

On first opening, the edge 70 of the extraction opening 80 separating section 50*a* from the remainder of the barrier layer 50 may be defined by lines of weakening in the barrier layer 50 or by actual cuts (shown by dotted lines in FIG. 1). When the label 90 is pulled back, the section 50*a* of the barrier layer 50, which remains adhered to the underside of the label 90, separates from the remainder of the barrier layer 50 along the lines of weakening or cuts to open the extraction opening 80. The consumer is then free to remove cigarettes 40 from the bundle 60 through the extraction opening 80 and, after having done so, reseal or close the extraction opening 80 by bringing down the tab 91 so that the edge of the label 90 re-adheres to the barrier layer 50 in a region surrounding the periphery of the extraction opening 80. The section 50*a* of barrier layer 50 formed by the separation when the tab 91 is lifted is returned to its previous position within the extraction opening 80. Although there is a line of separation in the barrier layer 50, it is covered by the adhered edges of the label 90.

It shall be appreciated that the label 90 need not be separate covering adhered to the surface of the barrier layer 50, but may instead be integral with the barrier layer 50. For example, the barrier layer 50 may be formed from a laminate material having an inner layer and an outer layer. The inner layer is defined as the layer adjacent the cigarettes. In such embodiments, the outer edges of the label 90 are cut into the outer layer of the laminate by a laser or other suitable means, while the edges 70 of the extraction opening 80 are cut into the inner layer.

As the tab 91 can be relatively difficult to grasp, the label 90 and/or tab 91 may be attached to an inside surface 33 of the front wall 26 of the lid 7 so that the label 90 is peeled back to reveal the extraction opening 80 at the same time the lid 7 is opened. In particular, with the lid 7 in an open position, as shown in FIG. 2, section 50*a* of the barrier layer 50 is drawn back to reveal the extraction opening 80 and enable a consumer to readily extract a cigarette 40 from the bundle 60.

Although in the above described embodiments the illustrated blanks '1 and corresponding packs 1 comprises a flip top lid 7. It shall be appreciated that the concept of using partial cuts 32 in the outer surface may be applied to other pack designs where the pack is formed from a folded blank of material. The advantage of using partial cuts 32 in the outer surface applies equally well to any pack that is formed by adhering folded panels of a blank together in a similar way to the way described above. For example, packs such as 'shell and slide' packs or 'clamshell' packs—which are pack terms readily apparent to a person skilled in the art—would be formed from folded blanks of material in which corresponding blanks are passed through a plough folder to fold the blanks and allow the various panels to be adhered together.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A pack for consumables, the pack being formed from a folded blank of material having a thickness, wherein the pack comprises a cut in an outer surface of the pack that extends only partially through the thickness of the folded blank of material, the folded blank of material being made of paper board, wherein the cut is between 10% and 80% of the paper board thickness, wherein the paper board comprises a basis weight between 200 gsm and 270 gsm, and wherein the cut is between 0.08 mm and 0.35 mm wide.

2. The pack of claim 1, wherein the cut extends along a fold line between adjacent walls of the pack.

3. The pack of claim 2, wherein the pack comprises a front panel and a rear panel separated by side panels, and wherein the cut comprises cuts extending along fold lines between the front panel and the side panels and along fold lines between the rear panel and the side panels.

4. The pack of claim 1, wherein the paper board is between 0.1 mm and 1 mm thick.

5. The pack of claim 1, wherein the paper board comprises a basis weight of 200 gsm; or 240 gsm; or 270 gsm.

6. The pack of claim 1, wherein the cut is 20% of the paper board thickness; or 30% of the paper board thickness; or 40% of the paper board thickness.

7. The pack of claim 1, wherein the cut is less than 0.15 mm wide.

8. The pack of claim 3, wherein the pack comprises a lid rotatably connected to the rear panel of the pack.

9. The pack of claim 8, wherein the lid comprises a front panel and a rear panel separated by side panels and wherein the cut comprises cuts extending along fold lines between the front panel and side panels and along fold lines between the rear panel and side panels.

10. The pack of claim 2, wherein the cut comprises adjacently extending cuts that delimit an intermediate surface of the pack, wherein the intermediate surface extends between two surfaces of the pack that are perpendicular to each other.

11. The pack of claim 10, wherein the intermediate surface comprises two or more surfaces that are arranged at an oblique angle with respect to each other.

12. The pack of claim 10, wherein the cut defines a pattern in the outer surface of the pack.

13. The pack of claim 12, wherein the pattern comprises a tessellation of polygons.

14. The pack of claim 1, wherein the pack comprises a bundle of consumables wrapped in a barrier material.

15. The pack of claim 14, wherein the barrier material comprises a consumable extraction region, and wherein a label is provided attached to the barrier material to cover the consumable extraction region.

16. The pack of claim 15, wherein the label has a peripheral portion that extends beyond the consumable extraction region and is peelable in use away from the barrier material to open the consumable extraction region to provide access to the bundle of consumables.

17. The pack of claim 16, wherein the label is attached to a lid so that in use the peripheral portion of the label is peeled away from the barrier material at the same time the lid is rotated into an open position.

18. A method of forming a pack for consumables comprising:

forming a cut in a blank of material, the blank of material being made of paper board; and folding the blank of material into the pack so that the cut is on an outer surface of the blank of material, wherein the cut is between 10% and 80% of the paper board thickness, wherein the paper board comprises a basis weight between 200 gsm and 270 gsm, and wherein the cut is between 0.08 mm and 0.35 mm wide.

* * * * *